United States Patent [19]

Matsumoto et al.

[11] Patent Number: 5,497,461
[45] Date of Patent: Mar. 5, 1996

[54] DATA TRANSMISSION ERROR CONTROL APPARATUS

[75] Inventors: Shigekazu Matsumoto; Masakazu Furuta, both of Matto, Japan

[73] Assignee: Irem Corporation, Osaka, Japan

[21] Appl. No.: 79,596

[22] Filed: Jun. 22, 1993

[51] Int. Cl.⁶ .................................................. G06F 13/14
[52] U.S. Cl. ........................................................ 395/185.04
[58] Field of Search ............................. 395/575, 183.13, 395/183.15, 183.19, 183.03, 183.04; 371/32, 33

[56] References Cited

U.S. PATENT DOCUMENTS

| | | | |
|---|---|---|---|
| 4,439,859 | 3/1984 | Donnan | 371/32 |
| 4,999,834 | 3/1991 | Leo et al. | 370/94.1 |
| 5,335,233 | 8/1994 | Nagy | 371/32 |
| 5,384,770 | 10/1994 | Mays et al. | 370/43 |

*Primary Examiner*—Hoa T. Nguyen
*Assistant Examiner*—Stephen Elmore
*Attorney, Agent, or Firm*—Nikaido, Marmelstein, Murray & Oram

[57] ABSTRACT

A main CPU in a data transmitting section applies a packet number recorded in a packet number memory to a block data when transmitting the latter, and increments and updates the packet number upon completion of the transmission. A sub-CPU in a data receiving section determines whether the packet number applied to the block data received is the updated number or not, in order to determine whether the data is a re-transmission of previous data or a transmission of new data. If the block data received is a re-transmission of previous data, the data received previously is discarded. If the block data received is new data, the data received previously is processed.

3 Claims, 9 Drawing Sheets

DATA TRANSMISSION ERROR CONTROL APPARATUS

BACKGROUND OF THE INVENTION

1. Field of the Invention

The present invention relates to an error control apparatus used in a system for communicating data between a plurality of computers, and particularly to an apparatus for detecting and correcting errors in data transmitted.

2. Description of the Related Art

One example of data transmission error control will be described hereunder with reference to FIG. 1.

This figure shows a processing sequence of error control for data transmission from a transmitting computer referenced T to a receiving computer referenced R. This processing is carried out by CPUs (central processing units not shown) mounted in the respective computers.

(1) First, when data is transmitted from computer T, computer R receives and temporarily stores the data, and returns the data (the data returned being called echo data).

(2) Upon receipt of the echo data, computer T compares the data transmitted and echo data, and determines whether the two data are in agreement. In the event of disagreement, computer T decides that an error has occurred in the data transmission, outputs "NAK (negative acknowledge signal)" to computer R, and re-transmits the data thereto. Upon receipt of "NAK", computer R discards the data temporarily stored therein, and receives the data re-transmitted.

(3) If the data transmitted and echo data agree, computer T outputs "ACK (positive acknowledge signal)" to computer R. Then, computer R accepts the data temporarily stored therein.

The data transmitted as above is one of an "8-bit unit" divided from a group of data. This group of data is hereinafter referred to as a block data or just a block. Once data transmission for one block is completed, a block check (for detecting a transmission error for each block) is carried out as follows:

(4) The transmitting computer T performs Ex-OR operations (exclusive ORs) of all transmitted data in a block, and transmits results of the operations to computer R. Upon receipt of these results, computer R performs Ex-OR operations of the data received, and compares results of these operations with the results of the Ex-OR operations of the transmitted data to determine whether they agree or not. In the event of disagreement, computer R transmits an error signal to computer T. In the event of agreement, computer R transmits the results of the Ex-OR operations of the received data to computer T.

(5) Upon receipt of the error signal from computer R, computer T re-transmits the data in the block. If the results of the Ex-OR operations of the received data are received, computer T compares these results with the results of the Ex-OR operations of the transmitted data to determine whether they agree or not. In the event of disagreement, computer T re-transmits the data in the block. In the event of agreement, computer T transmits a completion command to computer R.

(6) Upon confirmation of receipt of the completion command, computer R transmits the same completion command back to computer T, and processes the data already received.

(7) After confirming the completion command returned from computer R, computer T proceeds to a next data transmission or other processing.

In this way, transmission errors are detected and corrected (by re-transmission) for individual data forming a block, and then a block check is carried out also. In the absence of transmission errors, the receiving computer R processes the data received. Besides the above system, there are various other transmission error controlling systems. Nevertheless, the sequence of "detecting and correcting transmission errors, and thereafter processing the data" is common to most of such systems.

However, although the data transmission error control described above is effective for dealing with errors occurring in data transmission per se, a certain problem arises in the following case.

A transmission error due to an external noise may occur in the final stage of data communication between the two computers R and T as set forth in paragraph (6) above, i.e. when the completion command is transmitted from computer R back to computer T in the above example. This will result in a discrepancy in decision between the receiving computer R and transmitting computer T. This discrepancy is such that the receiving computer R has confirmed completion of the data transmission, but the transmitting computer T has not.

Such a discrepancy between the two computers R and T affects subsequent processing. That is, the transmitting computer T, not having confirmed completion of the data transmission, re-transmits the same block data to the receiving computer R. Since the receiving computer R has confirmed completion of the preceding data transmission, this computer R regards this block data as new data and carries out processing accordingly. As a result, the processing sequence will be thrown into confusion.

Assume, for example, a sequence of carrying out certain processing after computer T transmits data B1 (i.e. data in a block) and then data B2 to computer R. When computer T fails to confirm completion of data B1 transmission and re-transmits data B1, computer R regards the re-transmitted data B1 as data B2 and carries out processing accordingly. As a result, the processing sequence of data B1 and then data B2 actually becomes a confused sequence of data B1 and again data B1.

A specific example of this problem will be described hereinafter in conjunction with "data transmission in a computer game machine". The computer game machine in this example provides a mechanized version of craps. In the game of craps, players place bets in desired positions on a craps table on which a layout is printed, two dice are thrown on the table, and the total number shown by the dice and the odds afforded by the positions in which the bets are placed determine wins and losses. The role to throw the dice (the thrower is called the shooter) is changed from one player to another in rotation.

As shown in perspective in FIG. 2, this game machine includes two CRT displays 1 disposed centrally thereof for displaying the same image as the layout of the craps table and dice presented by computer graphics, and six control panels 2 arranged around the CRT displays 1 to be operable individually by six players. The CRT displays 1 and control panels 2 constitute a game deck 3. The game machine further includes an illuminating table 4 supported on four columns over the game deck 3.

Each control panel 2 includes a trackball 5 for controlling the dice, a BET button 6 for betting coins, a payoff return, not shown, for paying out coins, a digital display for displaying the number of coins paid out, and a speaker for producing a sound effect.

The above craps game machine has a main CPU (M-CPU), and sub-CPUs (S-CPUs) provided for the respective control panels 2. The M-CPU controls displays on the CRT displays 1, progress of the game, the numbers of coins to be paid out, and the like. Each S-CPU extracts control data of the trackball 5, information on the number and position of coins bet by a player (BET information), and the like. And data communication is conducted between the M-CPU and S-CPUs.

The problem noted hereinbefore is expected to give rise to the following inconveniences, for example:

[1] Assume that the M-CPU outputs a command to the S-CPUs to transmit BET information whereupon the S-CPUs transmit the corresponding data to the M-CPU, and that an error occurs with a completion command finally transmitted from one S-CPU to the M-CPU. In this case, the M-CPU does not proceed to next processing, as it decides that the data transmission for BET information has not completed. This results in the inconvenience that the coins do not appear in the bet positions on the CRT displays 1 intended by the players.

[2] Assume that the M-CPU outputs a command to the S-CPUs to transmit control data of the trackballs 5 whereupon the S-CPUs transmit the corresponding data to the M-CPU, and that an error occurs with a completion command finally transmitted from one S-CPU to the M-CPU. In this case, the M-CPU does not proceed to next processing, as it decides that the control data transmission has not completed. This results in the inconvenience that the dice do not appear on the CRT displays 1 although a trackball 5 has been operated by a player.

SUMMARY OF THE INVENTION

The present invention has been made having regard to the state of the art noted above, and its object is to provide a data transmission error control apparatus which enables determination whether or not a group of data transmitted is a re-transmission of a preceding group of data.

The above object is fulfilled, according to the present invention, by a data transmission error control apparatus for use in a system for communicating data between a plurality of computers, the apparatus comprising:

identification number applying means included in a data transmitting section for applying an identification number to a block data transmitted;
  identification number updating means included in the data transmitting section for updating the identification number upon completion of transmission of the block data;
  data storage means included in a data receiving section for temporarily storing the block data received;
  identification number recognizing means included in the data receiving section for determining from the identification number applied to the block data whether the block data is a re-transmission of the block data transmitted previously or a transmission of a new block data; and
  executing means included in the data receiving section for discarding the block data stored in the data storage means when a result of determination indicates a re-transmission of the block data, and processing the block data stored in the data storage means when the result of determination indicates a transmission of a new block data.

According to this apparatus, the data transmitting section for transmitting a block data applies an identification number to the data, and updates the identification number upon completion of a first data transmission. The updated identification number is applied to a second block data transmitted.

The data receiving section temporarily stores the block data received in the first transmission, and determines from the identification number applied to the block data in the second transmission whether this is a re-transmission of the first block data or a transmission of a new block data. This determination is based on whether the identification number is an updated one or not.

If the data received is a re-transmission of the first block data, the data receiving section discards the block data stored. If the data received is a transmission of a new block data, the data receiving section processes the block data stored, and temporarily stores the new data received in the second transmission.

As above, this apparatus determines whether the second transmission is a re-transmission of the first block data or not. Thus, when the data transmitting section re-transmits the first block data after determining an error having occurred in the final stage of the first data transmission, no discrepancy occurs between the decisions made by the data transmitting section and data receiving section (as to completion of the first data transmission). A subsequent processing sequence may be carried out without confusion.

BRIEF DESCRIPTION OF THE DRAWINGS

For the purpose of illustrating the invention, there is shown in the drawings one embodiment which is presently preferred, it being understood, however, that the invention is not limited to the precise arrangements and instrumentalities shown.

DETAILED DESCRIPTION OF THE PREFERRED EMBODIMENT

A preferred embodiment of the present invention will be described in detail hereinafter with reference to the drawings.

A data transmission error control apparatus in a craps game machine as noted hereinbefore, which is one example of computer game machines, will be described.

Figure 1:
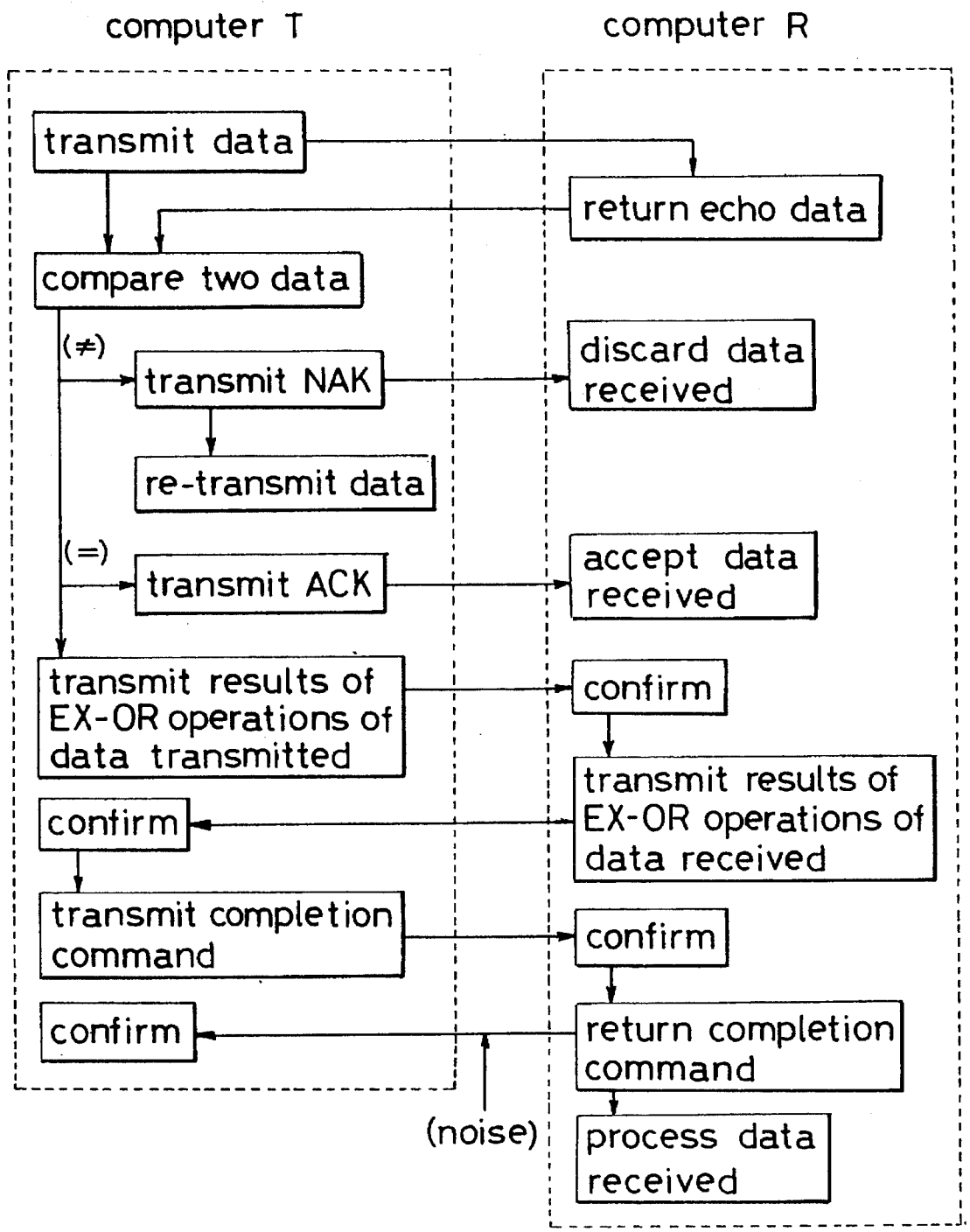
FIG. 1 is an explanatory view of one example of conventional methods of controlling data transmission errors.
Figure 2:
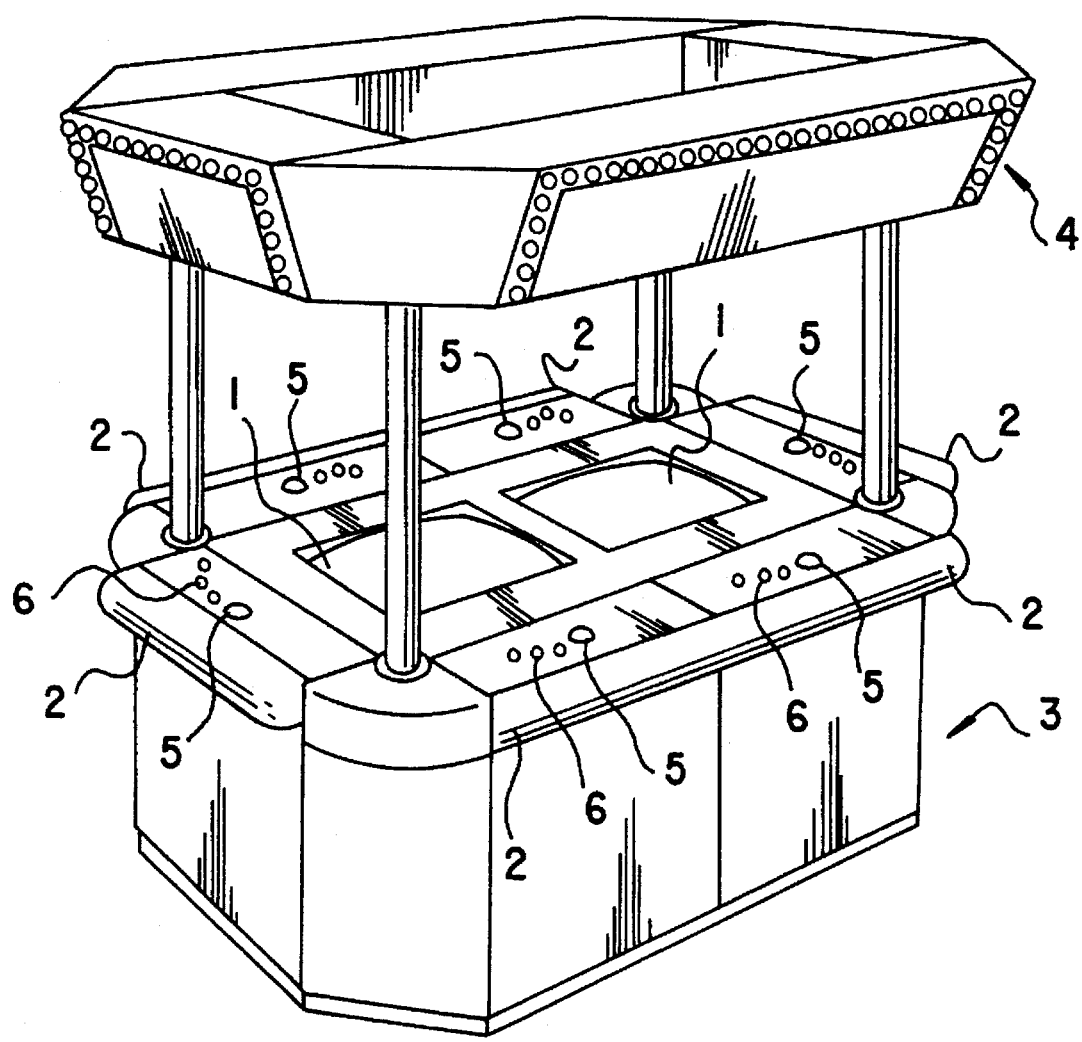
FIG. 2 is a perspective view of a computer game machine, which is one example of machines which may employ a data transmission error control apparatus according to the present invention.
Figure 3:
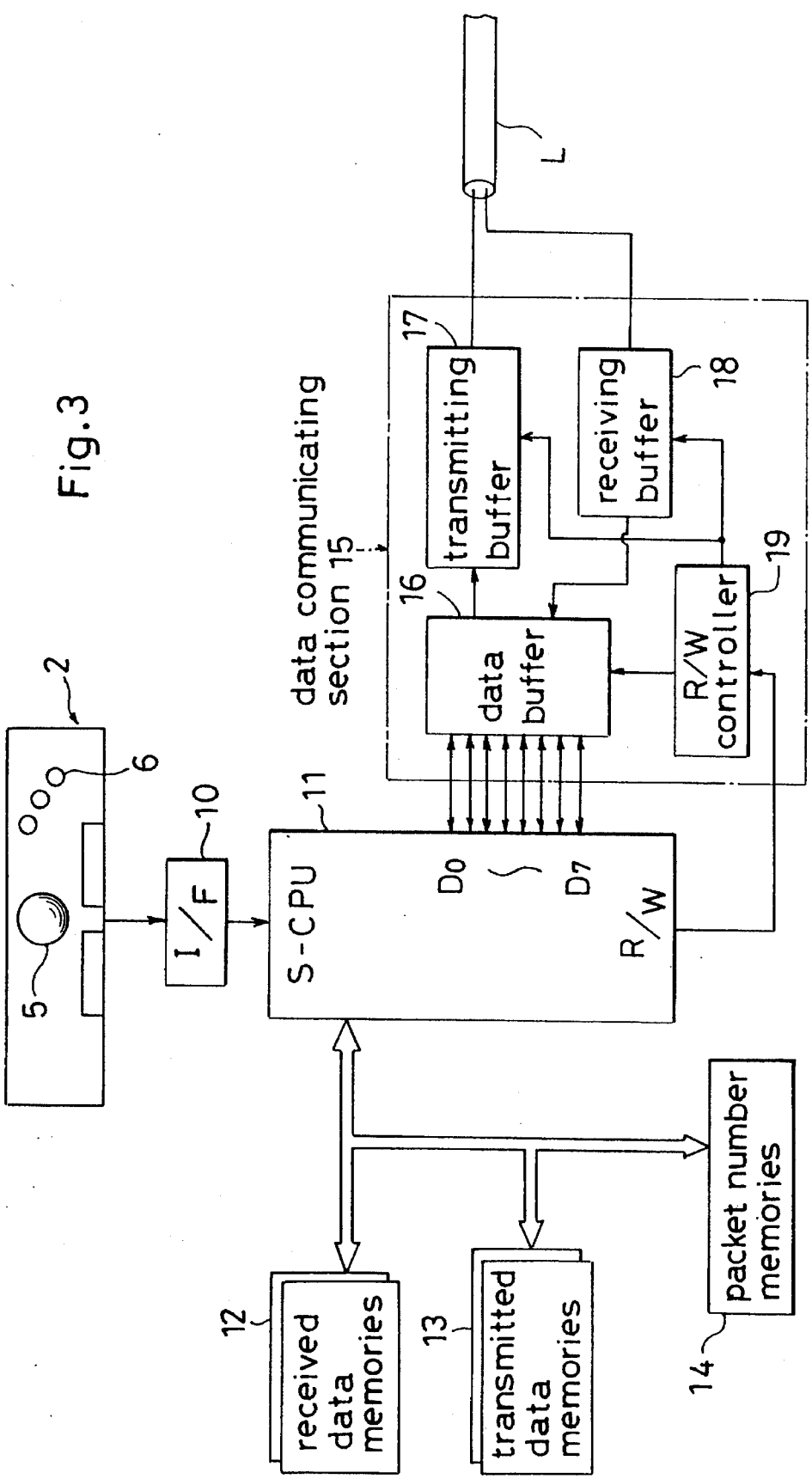
FIG. 3 is a block diagram showing an outline of a data receiving section in one embodiment of the present invention.
Figure 4:
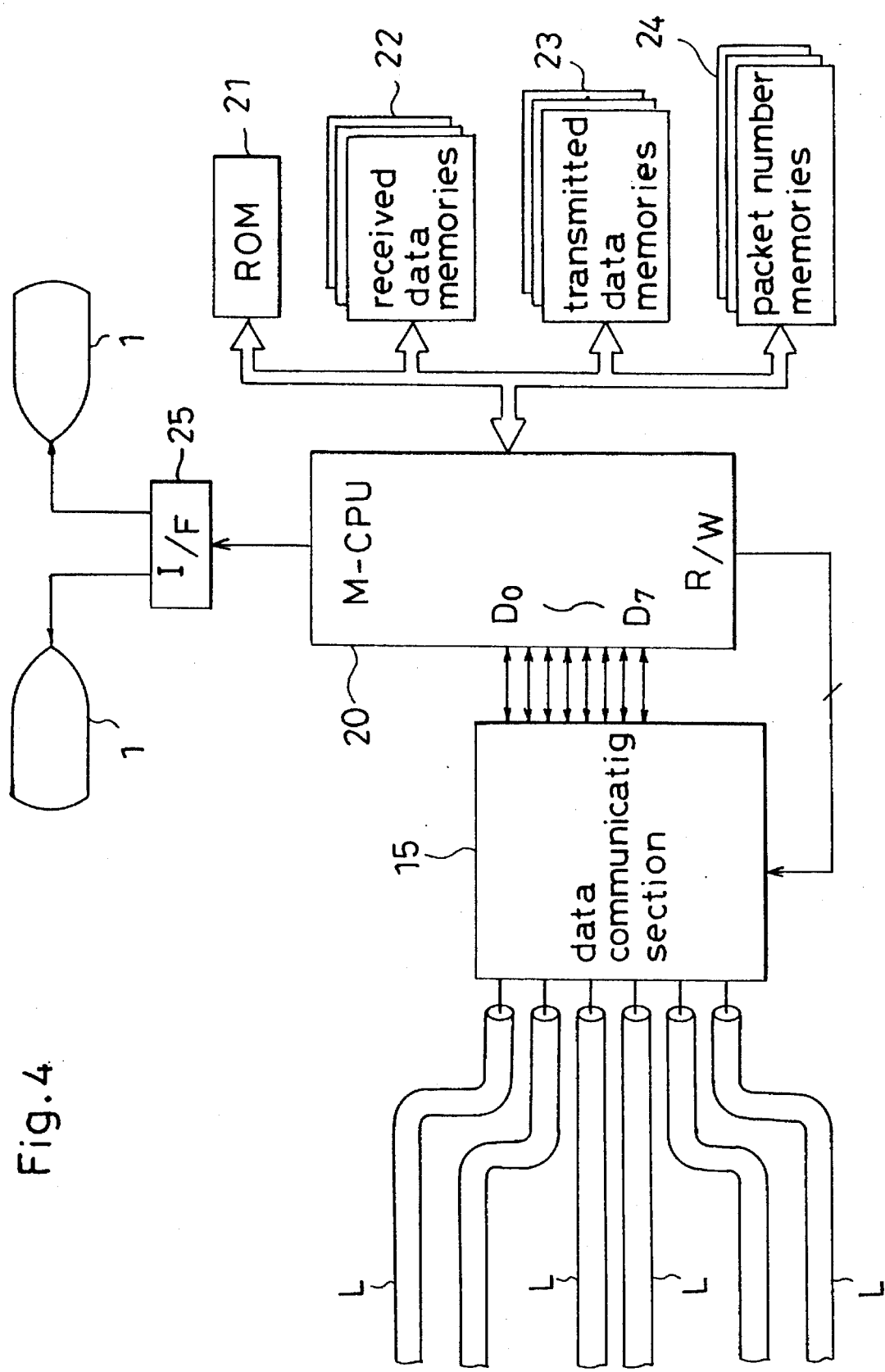
FIG. 4 is a block diagram showing an outline of a data transmitting section connected to the data receiving section shown in FIG. 3.

In this game machine, data are communicated between the sub-CPUs (S-CPUs) provided for the respective control panels 2, and the main CPU (M-CPU) which controls an overall progress of the game. FIG. 3 shows a block diagram of an outline of a data transfer section having one S-CPU acting as a central component thereof. FIG. 4 shows a block diagram of an outline of a data transfer section having the M-CPU acting as a central component thereof.

As shown in FIG. 3, S-CPU 11 is connected through an interface 10 to the control panel 2 having a trackball 5, a BET button 6 and the like. Further, S-CPU 11 is connected to received data memories 12, transmitted data memories 13, a packet number memory 14 and a data communicating section 15.

Each received data memory 12 is a memory for storing data transmitted from M-CPU 20. Each transmitted data memory 13 is a memory for storing control data output from the control panel 2 (the control data being transmitted to M-CPU 20).

The packet number memory 14 is a memory for storing an identification number in the present invention (which is called a packet number in this embodiment), which number is in three bits of numerals 0 to 7. That is, S-CPU 11 updates the packet number with every data transmission.

The data communicating section 15 includes a data buffer 16 for temporarily storing data transmitted from S-CPU 11 and data received from M-CPU 20, a receiving buffer 18 for temporarily storing and buffering the received data at a time of data reception until the data buffer 16 becomes free, a transmitting buffer 17 for temporarily storing and buffering the data from the data buffer 16 until the data can be transmitted to M-CPU 20, and a R/W controller 19 operable in response to control signals from S-CPU 11 to control reading and writing of the buffers 16, 17 and 18.

As shown in FIG. 4, the data transfer section having M-CPU 20 acting as a main component thereof includes a data communicating section 15 (having a construction similar to the data communicating section 15 in FIG. 3) to which communication lines L extend from the S-CPUs 11 of the six control panels 2 of the game machine, a ROM 21 for storing a game program, received data memories 22 for storing data received from the respective S-CPUs 11 (six S-CPUs 11), transmitted data memories 23 for storing data transmitted to the respective S-CPUs 11, and packet number memories 24 for storing packet numbers applied to the data transmitted to the respective S-CPUs 11. The two CRT displays 1 are connected to the M-CPU 20 through an interface 25.

Figure 5:
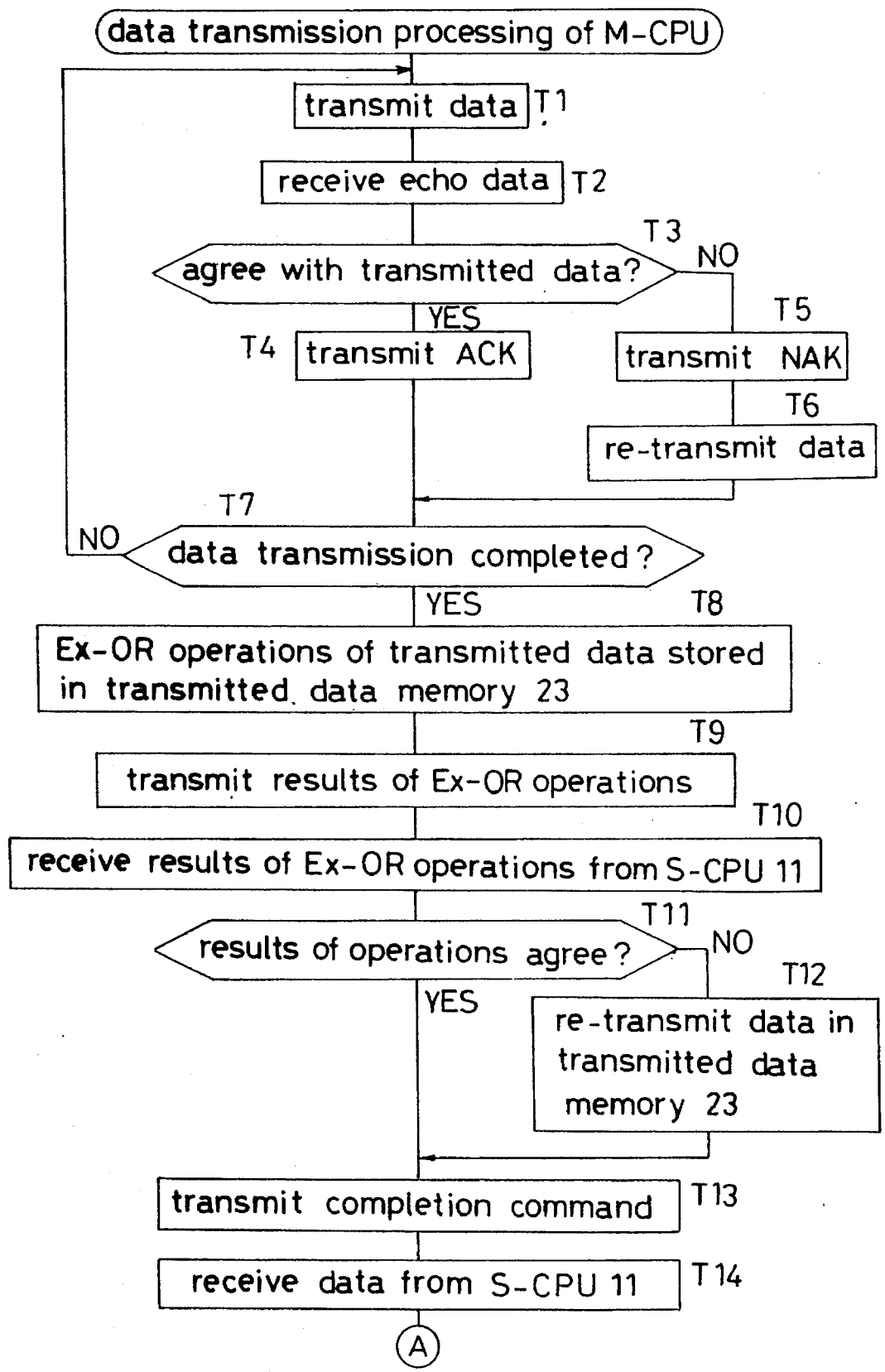
FIG. 5 is a flowchart of a processing sequence of the data transmitting section shown in FIG. 4.
Figure 6:
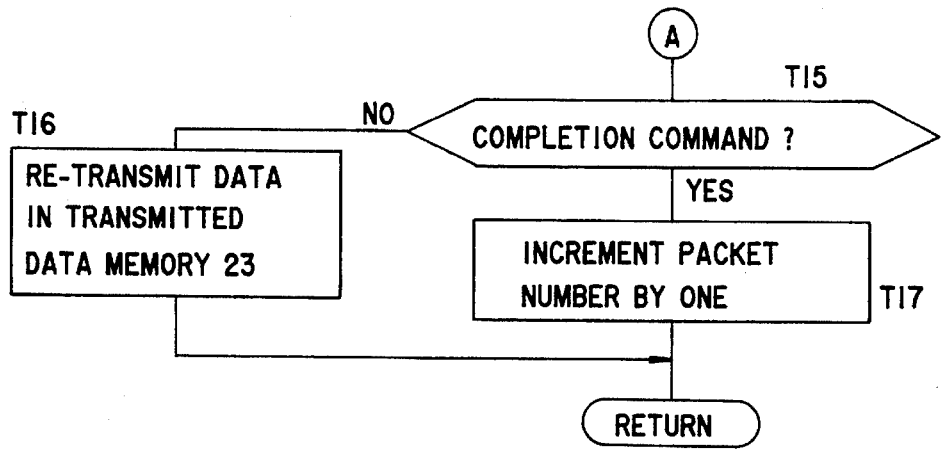
FIG. 6 is a flowchart of a processing sequence continuing from the flowchart of FIG. 5.
Figure 8:
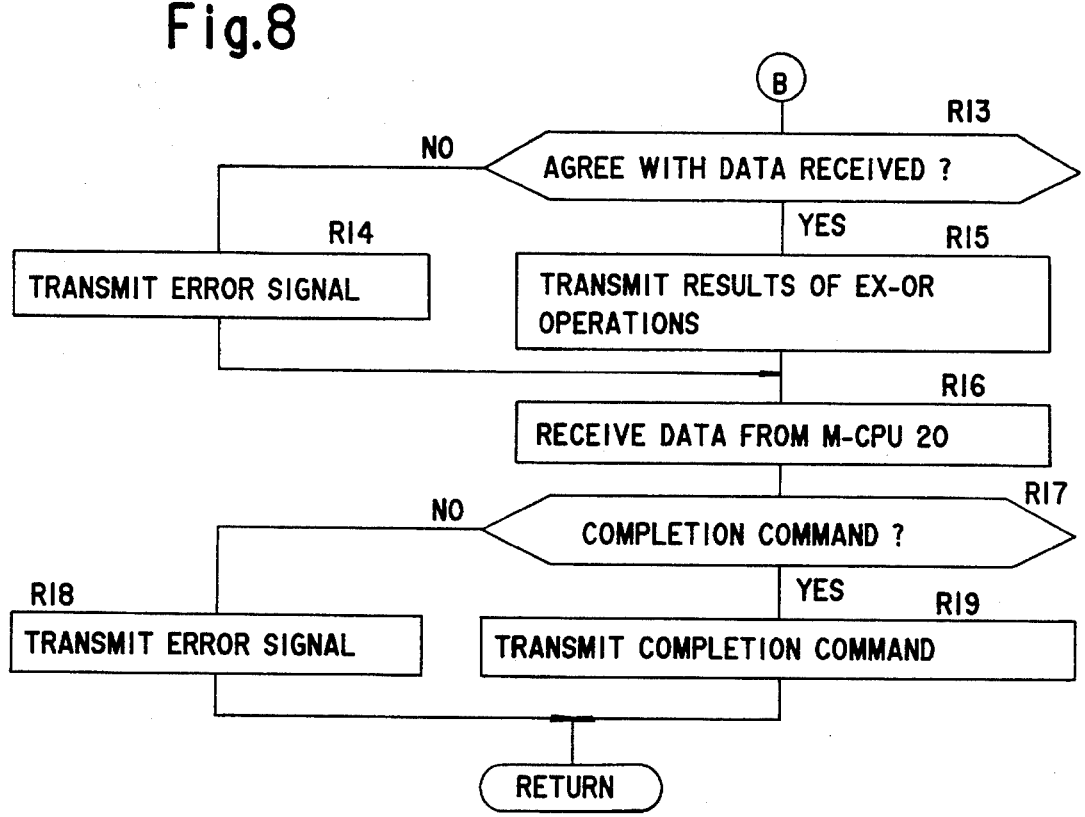
FIG. 8 is a flowchart of a processing sequence continuing from the flowchart of FIG. 7.
Figure 7:
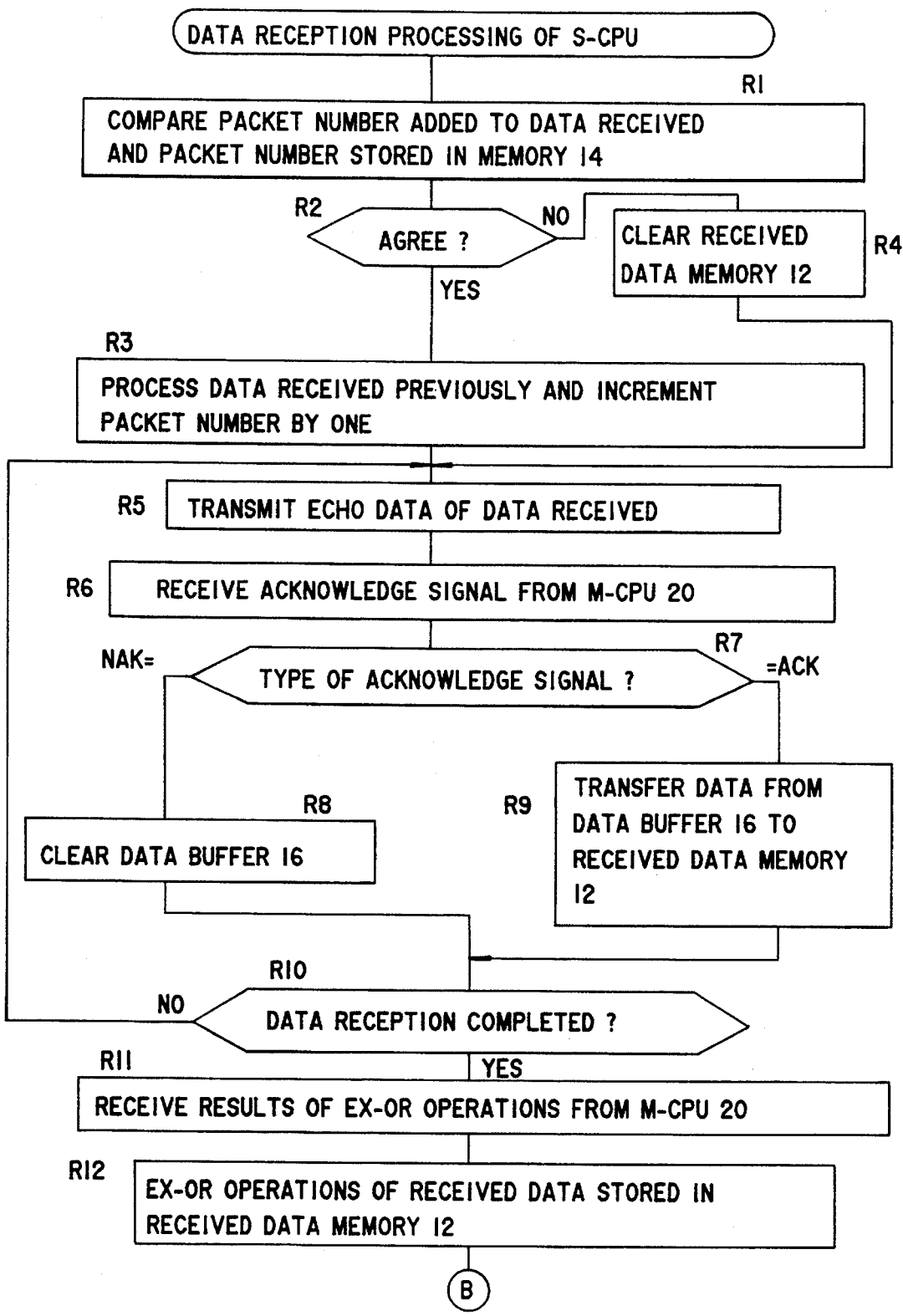
FIG. 7 is a flowchart of a processing sequence of the data receiving section shown in FIG. 3.

Next, a transmission error control effected when data is transmitted from M-CPU 20 to each S-CPU 11 will be described with reference to flowcharts in FIGS. 5 through 8 showing processing sequences of these CPUs. FIGS. 5 and 6 show the processing sequence of M-CPU 20, while FIGS. 7 and 8 show that of S-CPU 11. In the following example, data is transmitted from M-CPU 20 to S-CPU 11, in which therefore M-CPU 20 corresponds to the data transmitting section and S-CPU 11 the data receiving section of the present invention.

Figure 9:
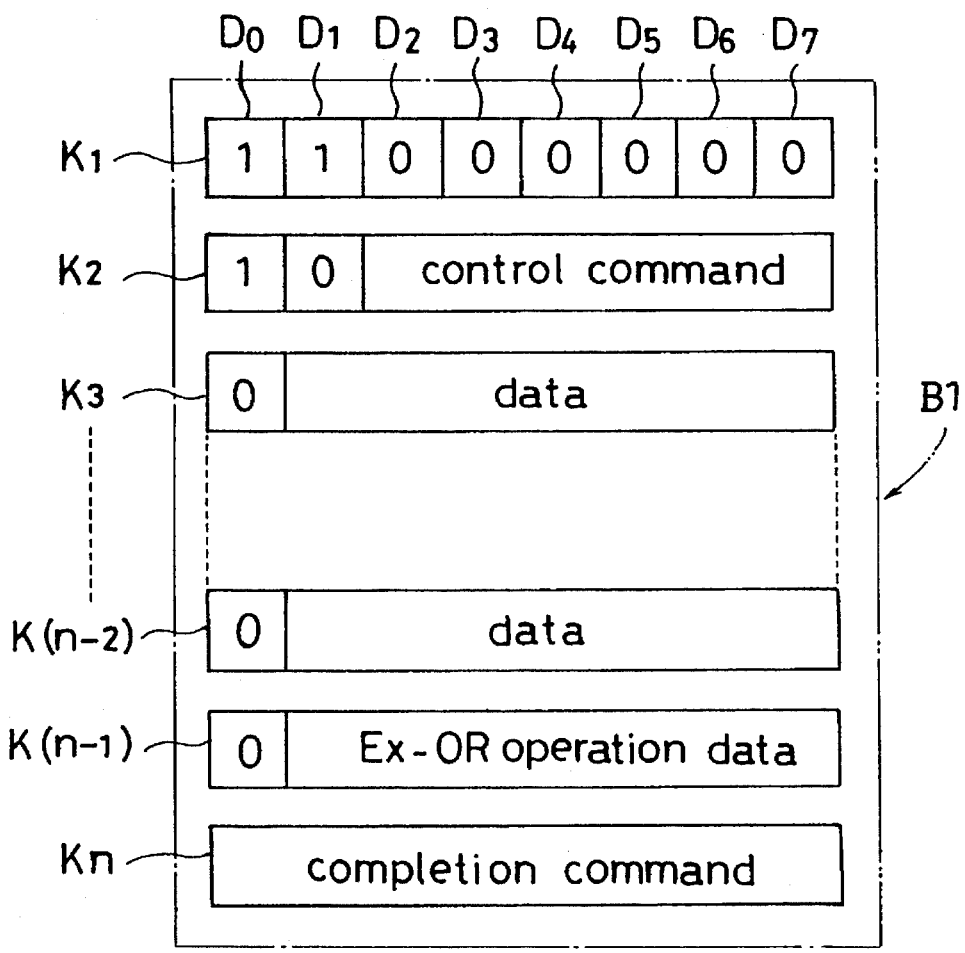
FIG. 9 is a conceptual view of one example of data structures transmitted to the data receiving section of the present invention.

First, at step T1 in FIG. 5, M-CPU 20 transmits data to S-CPU 11. The data transmitted, as shown in FIG. 9, is one of an 8-bit unit divided from a block data B1. References K1–Kn are affixed to divided 8-bit data series, and references D0–D7 to the 8-bit data. At step T1, the 8-bit data D0–D7 in data series K1 are transmitted to S-CPU 11.

The data series K1 transmitted first is a data series for transmitting an identification number or packet number of block B1 (a block being called a packet also). For example, data D0–D4 of upper five bits "11000" in data series K1 shown in FIG. 9 represent a code for transmitting the packet number, and data D5–D7 of lower three bits "000" represent the packet number. The packet number is read from one of the packet number memories 24 and applied to the data series K1.

Upon receipt of data series K1, S-CPU 11 determines from the upper five bits "11000" that data series K1 is one for transmitting a packet number, and extracts the subsequent lower three bits "000" as the packet number. Then, S-CPU 11 compares the packet number "000" extracted and a packet number recorded in the packet number memory 14 (step R1 in FIG. 7).

An initial value "000" of the packet number is recorded in both the packet number memory 14 provided for S-CPU 11 and one of the packet number memories 24 provided for M-CPU 20. Assuming that block B1 is transmitted from M-CPU 20 to S-CPU 11 in a first data transmission, the packet number transmitted from M-CPU 20 agrees with the packet number recorded in the packet number memory 14 of S-CPU 11 which is "000". Consequently, the result of step R2 in FIG. 7 is "YES" and the operation moves to step R3.

At step R3, the data received previously is processed, and the packet number is incremented by one. Naturally, at the time of first data transmission, the received data memory 12 of S-CPU 11 does not have the "data received previously". Thus, step R5 is executed after incrementing the packet number in the packet number memory 14 by one.

At step R5, the data series K1 received is temporarily stored in the data buffer 16 in the data communicating section 15 (see FIG. 3), and the data identical to data series K1 is returned as echo data to M-CPU 20.

M-CPU 20 receives this echo data at step T2 in FIG. 5, and compares the echo data with the transmitted data at step T3 (the latter being data series K1 transmitted at step T1, and recorded in one of the transmitted data memories 23 in FIG. 4). If the echo data agrees with the transmitted data, step T4 is executed to transmit a predetermined "ACK (positive acknowledge signal)" in eight bits, e.g. "11111001". In the event of disagreement, step T5 is executed to transmit "NAK (negative acknowledge signal)", e.g. "11110101", followed by step T6 to re-transmit data series K1.

S-CPU 11 receives the acknowledge signal at step R6 in FIG. 7, and determines the type of this signal at step R7. If the acknowledge signal is "ACK", it is determined that no transmission error (bit inversion) has occurred with the data received, and the operation proceeds to step R9 to transfer the received data (data series K1) stored in the data buffer 16 to the received data memory 12. If the acknowledge signal is "NAK", it is determined that a transmission error due to noise or the like has occurred during transmission of the data or its echo data. Then, step R8 is executed to clear the data buffer 16 and discard the data received. S-CPU 11 receives the re-transmission of data series K.

In this way, transmission, and transmission error detection and correction (data re-transmission) of one data series K1 in block B1 shown in FIG. 9 are carried out. The data series K1 transmitted from M-CPU 20 is stored in the received data memory 12 of S-CPU 11.

The next data series K2 transmitted from M-CPU 20 is a data series for transmitting a control command, which includes upper two bit data D0 and D1 "1, 0" representing a code for control command transmission, and lower six bit data D2–D7 indicating a processing instruction for S-CPU 11 and a transmitted data length. The transmitted data length is indicative of an amount of data in data series K3 to K(n–2) to be transmitted subsequently. S-CPU 11 will receive only the amount of data indicated by data series K2, and stores data series K3 to K(n–2) in the received data memory 12 by repeating the above processing.

At step T7, M-CPU 20 determines whether the data transmission has completed for data series K3 to K(n–2) or not. If it has, the operation proceeds to steps T8 and T9 to carry out Ex-OR operations of the transmitted data in the transmitted data memory 23, and transmits results of the operations to S-CPU 11.

Similarly, S-CPU 11 determines whether the amount of data indicated by data series K2 has been received or not. If it has, step R11 is executed to receive the results of Ex-OR operations from M-CPU 20. At step R12, S-CPU 11 carries out Ex-OR operations of the received data stored in the received data memory 12. At step R13, the results are compared with the results of Ex-OR operations transmitted from M-CPU 20 (i.e. the block check noted hereinbefore). If the comparison shows a disagreement between the two, S-CPU 11 transmits an error signal to M-CPU 20. If they agree, S-CPU 11 transmits data of the Ex-OR operations of the received data to M-CPU 20.

M-CPU 20 receives the data of the Ex-OR operations from S-CPU 11 at step T10, and also compares the two data for a block check at step T11. If they disagree, step T12 is executed to re-transmit the data stored in the transmitted data memory 23. This is the same as when an error signal is transmitted as a result of processing at S-CPU 11 as noted above. If the two data agree, M-CPU 20 determines that all the data in block B1 have been transmitted without an error. Then, step 13 is executed to transmit a completion command to S-CPU 11.

S-CPU 11 receives the data from M-CPU 20 at step R16 in FIG. 8, and determines at step R17 whether this data is a completion command or not. If it is not a completion command, step R18 is executed to transmit an error signal. If a completion command is confirmed, step R19 is executed to transmit the same completion command to M-CPU 20.

M-CPU 20 receives the data from S-CPU 11 at step T14 in FIG. 5, and determines at step T15 in FIG. 6 whether this data is the completion command or not. If it is not the completion command, step T16 is executed to re-transmit the data in the transmitted data memory 23. If the completion command is confirmed, step T17 is executed to increment the packet number recorded in the packet number memory 24 by one, and returns to step T1.

The data transmission for block B1 is completed in this way. As noted hereinbefore, an external noise may occur in the final data communication between M-CPU 20 and S-CPU 11, i.e. when S-CPU 11 returns the completion command transmitted from M-CPU 20. Such a noise would invert the bits representing the completion command, thereby causing M-CPU 20 to fail to confirm the completion command. The problem arising from this incident will be described hereinafter.

When M-CPU 20 fails to confirm the completion command returned from S-CPU 11 as noted above, the operation does not move to step T17 in FIG. 6, but moves to step T18 to re-transmit block B1. That is, block B1 is re-transmitted with the packet number in the packet number memory 24 of M-CPU 20 not updated (i.e. not incremented by one). The packet number applied to the block B1 re-transmitted remains the initial value "000".

On the other hand, the packet number recorded in the packet number memory 14 of S-CPU 11 has been incremented by one at step R3 to "001", which does not agree with the packet number in block B1 transmitted the second time. This is determined at the first steps R1 and R2 in FIG. 7, whereby S-CPU 11 proceeds to step R4. At this step, S-CPU 11 clears the received data memory 12 to discard the data stored therein (the data of block B1 received the first time) without processing them. Subsequently, S-CPU 11 receives the data of block B1 re-transmitted through the above processing.

Figure 10:
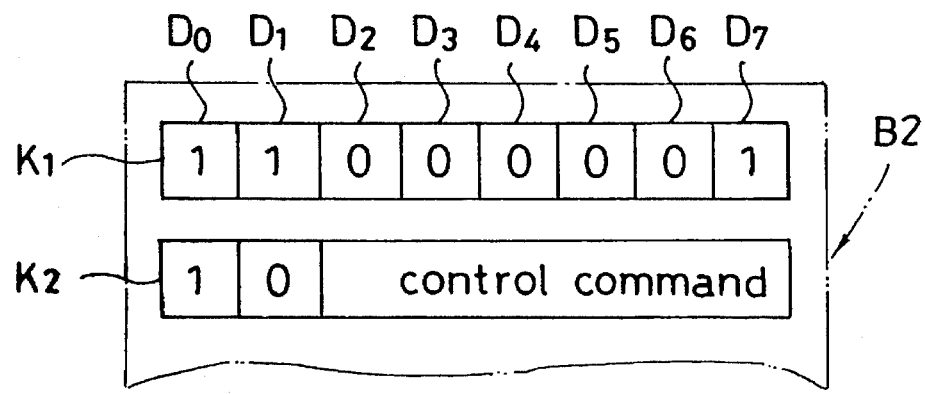
FIG. 10 is a conceptual view of another example of data structures transmitted to the data receiving section of the present invention.

When M-CPU 20 confirms the completion command for the data transmitted the first time, step T17 in FIG. 6 is executed to increment the packet number by one. Consequently, the packet number "001" is applied to the lower three bits of data series K1 in the second block B2 (see FIG. 10) transmitted from M-CPU 20 to S-CPU 11. This number agrees with the packet number "001" recorded in the packet number memory 14 of S-CPU 11. Thus, S-CPU 11 determines at step R2 in FIG. 7 that the second block received from M-CPU 20 is not the preceding block B1 re-transmitted but new block B2. Then, S-CPU 11 proceeds to step R3 to process the data stored in the received data memory 12 (i.e. the data of block B1 received the first time), and store the data of new block B2 in the other received data memory 12.

In this way, S-CPU 11 determines from the packet number in the data received from M-CPU 20 the second time whether the data is a re-transmission of the data received the first time or new data. If this is a re-transmission, S-CPU 11 discards the first data without processing them. That is, S-CPU 11 makes a decision similar to the decision made by M-CPU 20 concerning the error. As distinct from this, in the conventional data transmission error control, the S-CPU (corresponding to receiving computer R in the prior art), upon confirmation of a completion command for the first data, returns the completion command to the M-CPU (corresponding to transmitting computer T in the prior art) and processes the first data received. Consequently, the S-CPU and M-CPU make discrepant decisions when the M-CPU fails to confirm the completion command.

The above embodiment exemplifies a data transmission error control method which detects a transmission error by comparing transmitted data and echo data, and finally carries out a block check (to compare results of Ex-OR operations of received data and transmitted data). This data transmission error control method is not limitative, but a method may be employed which detects a transmission error by applying a parity bit, for example. In this case also, the construction according to the present invention solves the problem arising from an error occurring with the final data (completion command) communicated between S-CPU and M-CPU.

Figure 11:
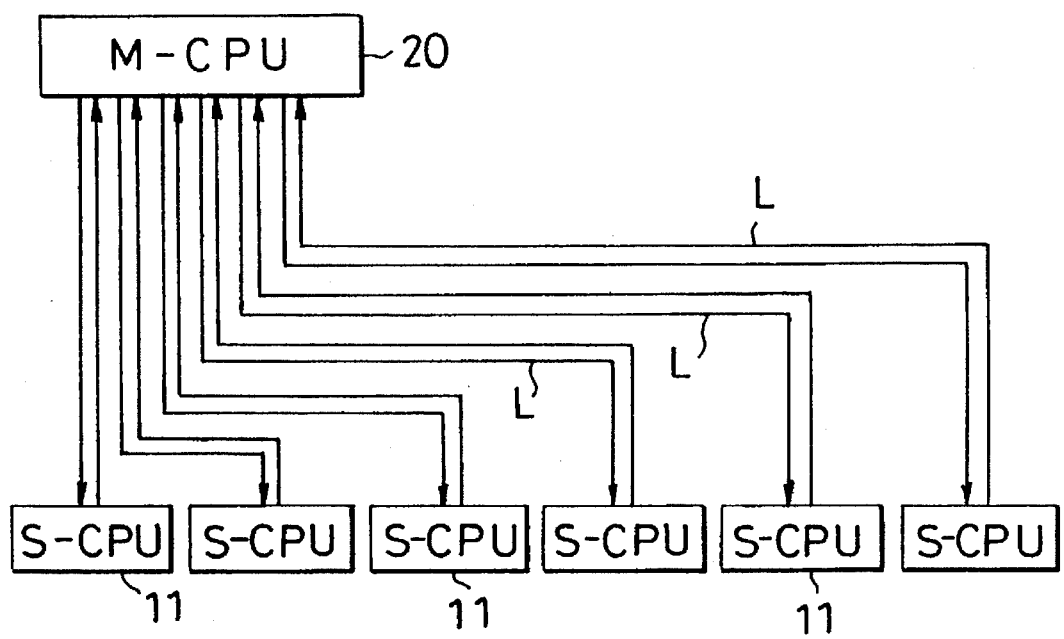
FIG. 11 is a view showing one example of networks of the data receiving sections and data transmitting section in the embodiment of the invention.
Figure 12:
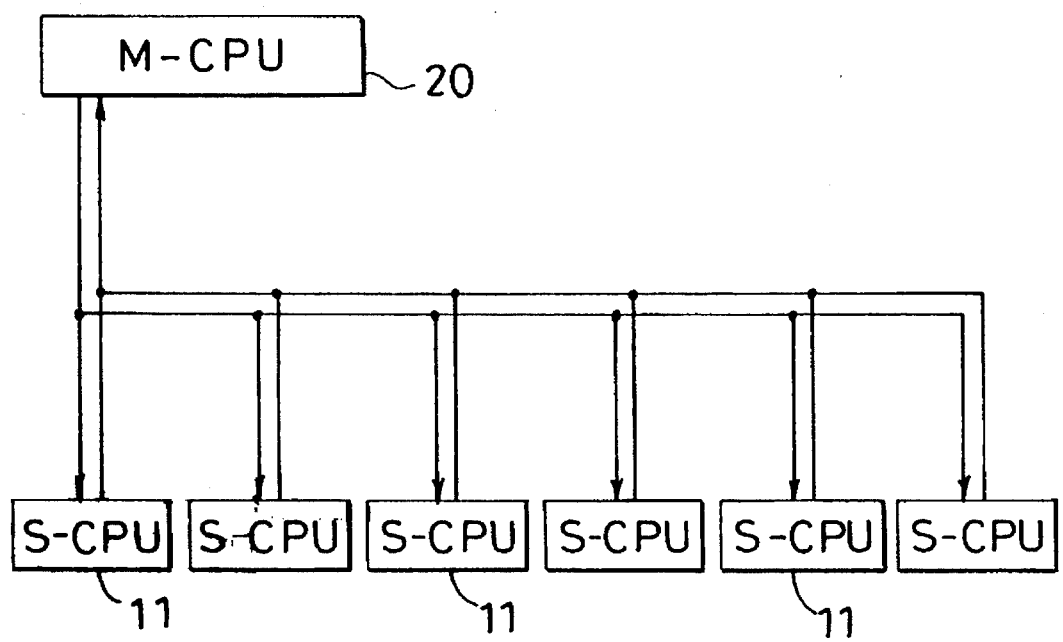
FIG. 12 is a view showing another example of networks according to the present invention using a common communication line.

In the network in the foregoing embodiment, the respective S-CPUs 11 have independent communication lines L for connection to M-CPU 20 as shown in FIG. 4. FIG. 11 schematically shows this network. This network is not limitative, but S-CPUs 11 may be connected to M-CPU 20 through a common communication line as shown in FIG. 12. In this case, however, it is necessary to apply signs at times of data transmission to identify the respective S-CPUs 11 connected through the common communication line.

The present invention may be embodied in other specific forms without departing from the spirit or essential attributes thereof and, accordingly, reference should be made to the appended claims, rather than to the foregoing specification, as indicating the scope of the invention.

What is claimed is:

1. A data transmission error control apparatus for use in a system for communicating data between a plurality of computers, said data transmission error control apparatus comprising:

a data transmitting section; and a data receiving section;

said data transmitting section including first identification number storage means for storing an identification number of a block data including actual information data to be transmitted to said data receiving section, identification number updating means for updating said identification number only upon confirmation of a completion command transmitted from said data receiving section when said data block is received properly, transmitted data storage means for storing said actual information data included in said block data, and transmission control means for dividing said data block into a plurality of data series, for transmitting, as a first data series, a) said identification number stored in said first identification number storage means, b) a data series of said actual information data stored in said transmitted data storage means, and c) a data series of a completion command, for retransmitting any of said data series when a retransmission request therefor is received from said data receiving section, and for retransmitting said data block transmitted previously, i.e. said data block including said data identification number without being updated, said actual information data and said completion command, unless a confirmation of said completion command is received from said data receiving section after said completion command is transmitted to said data receiving section; and said data receiving section including received data storage means for temporarily storing an initially received block data, second identification number storage means for storing an identification number determined identical to said identification number added in said data transmitting section, in order to confirm the identification number of a newly received data block, identification number recognizing means for determining whether said newly received block data is a retransmission of said initially received block data by comparing said identification number of said newly received block data and said identification number stored in said second identification number storage means, executing means for processing said initially received block data stored in said received data storage means, and for updating said identification number stored in said second identification number storage means according to a rule used for updating said identification number in said data transmitting section, when said two identification numbers are in agreement, and for discarding said initially received block data stored in said received data storage means when said two identification numbers disagree, and reception control means for successively checking data series of actual information data of said newly received data block after processing by said executing means, for requesting retransmission of a data series from said data transmitting section if an error is found therein, and for otherwise transmitting a completion command to said data transmitting section upon confirmation of the completion command from said data transmitting section.

2. An apparatus as defined in claim 1, wherein, in order to transmit said block data individually to a plurality of data receiving sections, said data transmitting section includes a plurality of transmitting side identification number storage means for storing said identification number for each data receiving section.

3. An apparatus as defined in claim 2, wherein said data transmitting section includes a main CPU (central processing unit) for controlling progress of an entire game in a computer game machine, and said data transmitting section include a plurality of sub-CPUs provided for a plurality of control panels of said computer game machine, respectively, for communicating data with said main CPU.

* * * * *